Nov. 20, 1951  W. D. THOMPSON  2,575,536
PLURAL FILM CAMERA
Filed July 31, 1947  3 Sheets-Sheet 1

INVENTOR.
William D. Thompson,
BY Lyon & Lyon
ATTORNEYS.

Nov. 20, 1951 W. D. THOMPSON 2,575,536
PLURAL FILM CAMERA
Filed July 31, 1947 3 Sheets-Sheet 2

INVENTOR.
William D. Thompson,
BY Lyon & Lyon
ATTORNEYS.

Patented Nov. 20, 1951

2,575,536

UNITED STATES PATENT OFFICE 2,575,536

PLURAL FILM CAMERA

William D. Thompson, San Diego, Calif.

Application July 31, 1947, Serial No. 765,079

11 Claims. (Cl. 95—10)

The present invention relates generally to a camera which may utilize one or a plurality of films arranged for selective exposure, and as an example, and not as a limitation, to two film cameras of the type shown in my United States Patent 2,315,284 issued March 30, 1943, on a multiple film carrying camera.

While certain features of the present invention are specifically related to improvements in the camera shown in my Patent 2,315,284, other features, for example, the novel cassette structure shown and described herein may be incorporated in cameras arranged to expose but one film.

An object of the present invention is to provide an improved multiple film carrying camera permitting the exposure of two films of similar or different character, for example, color film and black and white film, of the same scene at substantially the same time through a single lens system.

Another object of the present invention is to provide a camera adapted to carry two films which has a lens turret rotatably mounted therein with a plurality of different lenses on the camera together with a shutter turret also rotatably mounted on the camera and cooperated with either one of said lenses in such manner as to permit the same to be easily moved into position required for exposure of either one of the films through the selected lens and a single shutter mechanism on the shutter turret.

Another object of the present invention is to provide a camera adapted for carrying multiple films and including a lens turret having a plurality of lenses mounted thereon, a filter turret having mounted thereon a multiplicity of filters permitting exposure of either film through the lens system in conjunction with any one of the said filters as selected, and a shutter turret having mounted thereon a single shutter mechanism movable into aligned position with respect to a selected picture aperture in the camera frame.

Still another object of the present invention is to provide an improved camera arranged to expose either one of two films lying in the same plane in different film compartments, the camera incorporating a lens turret mounted for rotation about an axis perpendicular to the plane of the film and also incorporating a lens turret mounted for rotation about an axis perpendicular to the plane of the film and also incorporating a view finder which in accordance with important features of the present invention is automatically moved into adjusted position simultaneously when the shutter turret is moved for exposing either one of the two films thereby to provide compensations for the differences in distance between the view finder and the particular film being exposed.

Still another object of the present invention is to provide an improved cassette structure allowing the removal and replacement of strips of film before the complete roll of film initially loaded in the camera is exposed, the particular cassette structure being adaptable for use in either single film cameras or double film cameras of the type shown herein.

Yet another object of the present invention is to provide an improved cassette structure of the type specified above arranged in conjunction with an adjacent film channel which is automatically sealed, while the cassette structure is being removed, by the natural curl of the film.

Still another object of the present invention is to provide an improved cassette structure of the type specified in the second preceding paragraph incorporating resilient film guide means which is expanded more and more as more film is transferred into the cassette and which naturally increases the force necessary to project increased amounts of film into the cassette, the camera incorporating novel film driving means forming an important feature of the present invention to assure the storing of all of the roll film into the cassette without, for example, tearing the film between its driving perforations when such increased force becomes necessary to project the remaining film into the casette.

Yet a further object of the present invention is to provide an improved camera incorporating novel film guiding and propelling means assuring fool-proof transportation of the film and yet allowing easy loading and threading of the film in the camera.

Still another object of the present invention is to provide an improved cassette structure which may be placed in operative position in a camera behind a closure member mounted on the camera, the closure member incorporating a movable member arranged to cooperate with the movable element of the cassette structure to automatically cut film passing into the cassette when such movable member on the closure member is moved to a position where it unlocks the closure member from fastened position on the camera.

There is shown and described herein a unitary compact roll film camera having two individual film compartments which may each contain film of different characteristics with the film arranged in coplanar planes for selective exposure by one of a plurality of different lenses mounted on a lens turret which is mounted for rotation about an axis substantially perpendicular to the film planes for exposing either film. Preferably, the optical exposure system incorporates a ground glass viewing screen intermediate the two film strips to aid in properly focusing the system. Also, the optical exposure system incorporates adjustably positioned filter elements and includes as a novel feature thereof but one shutter mechanism mounted for movement for exposing either one of the two films. Because the camera is self contained, regardless of whether or not the optical exposure system is positioned for exposure of film, there are no separate detachable parts, the camera is comparable in size to a single film camera, using the same size film, and may be used after a minimum amount of instruction by persons already familiar with conventional single film roll cameras.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

The camera box or case 10 may be of any suitable or desirable construction and is generally regular in form and of a light-proof construction, as is well understood in this art. The camera box 10 is divided into two film carrying compartments 11 and 12 by means of a dividing partition 13 which prevents the light when admitted into either of the chambers 11, 12 as the case may be on exposure of the films carried therein from being transmitted into the other film chamber. In each of the chambers 11, 12 there is provided film reels 14, 15 of any suitable or desirable construction upon which the film to be exposed is reeled.

Suitable frame feeding mechanism 16 including the manually operable lever member 17 and the driving sprockets 18, 19 are disposed in a unique manner to transport film in, step by step or, frame by frame, manner from its corresponded associated film reel 14, 15 into corresponding cassette structures 20, 21, respectively, which also embodies unique features of the present invention. This mechanism, duplicated for each film serves to successively move portions of the film carried on the carrier reels 14, 15 into position for exposure.

Doors or covers 22, 23 are provided for individually closing the film compartments 11, 12 and, as herein indicated, these doors may be hinged at 24, 25, respectively, to the box 10. Each of the doors may be made light-tight.

Figures 1, 2, 3, 9, 15:
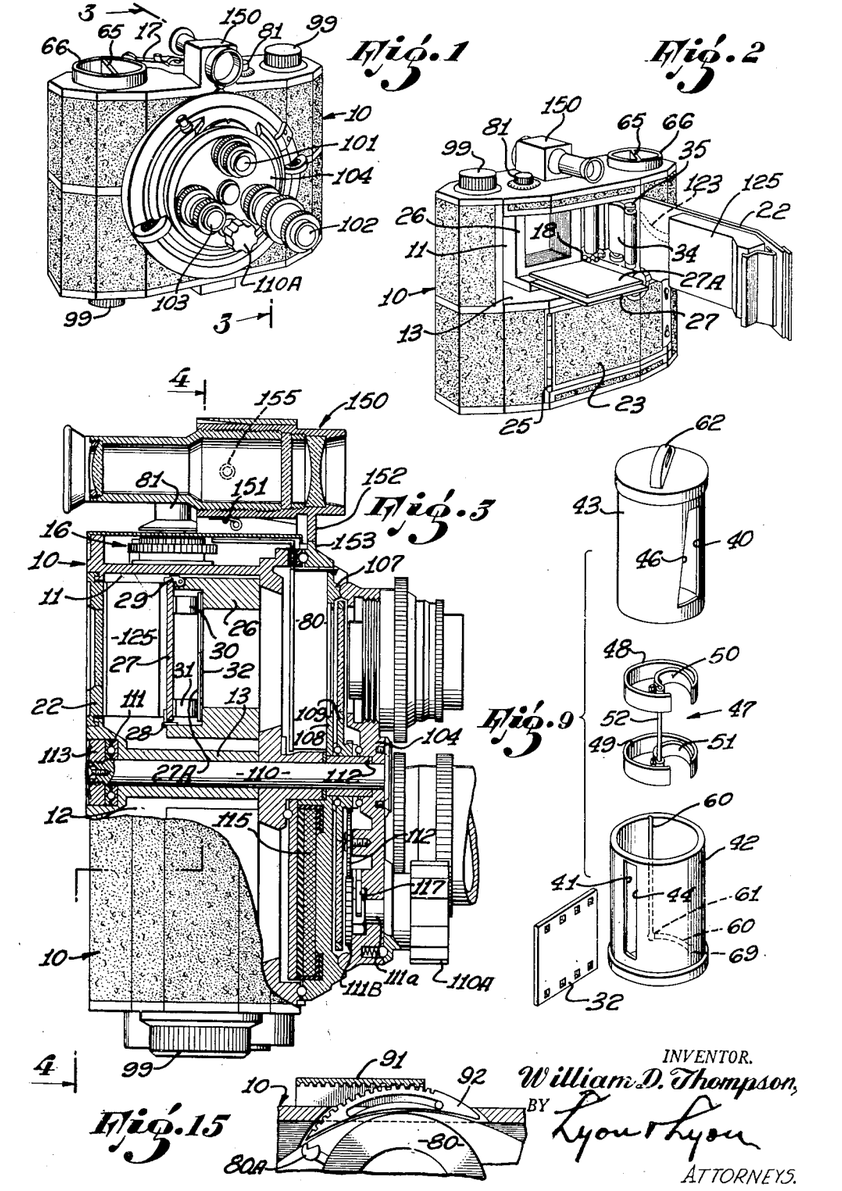
Figure 1 is a perspective view of the front of a camera embodying the present invention.
Figure 2 is a perspective view of the back of the camera shown in Figure 1 with one of the rear doors opened, the film pressure plate in its lowered hinged position and the pivoted film guide rollers being swung out to allow exposure of one of the film driving sprockets and the film aperture leading to the removable cassette through which film may be threaded.
Figure 3 is a sectional view taken substantially on the line 3—3 of Figure 1.
Figure 9 is an exploded view showing in perspective, the component parts of the cassette structure used in the camera shown in Figure 1 and indicates the manner in which film is threaded into the cassette structure.
Figure 15 is a sectional view taken substantially on the line 15—15 of Figure 5.

The film is maintained flat against the exposure frames 26 of film guides within the compartments 11, 12 by the gate 27 which is hinged as shown in Figure 2 at 28 and held in film engaging position by the latch member 29 whereby the leaf spring elements 30, 31 on gate 27 press the pressure plate 27A into engagement with the film 32. This gate arrangement is important in that the operator may load the camera, close the gate, stroke the film transport lever 17, and observe whether or not the film is in engagement with the sprocket wheels and feeding into the cassette compartment before closing the camera door. These pressure plates 27A are highly polished and bear against the entire back surface of the film with a large pressure applied to perforated film edges which are positioned between, on the one hand, the upper and lower edges of the exposure frame 26 and, on the other hand, the pressure plate 27A.

Figures 6, 10, 11, 12, 13, 14:
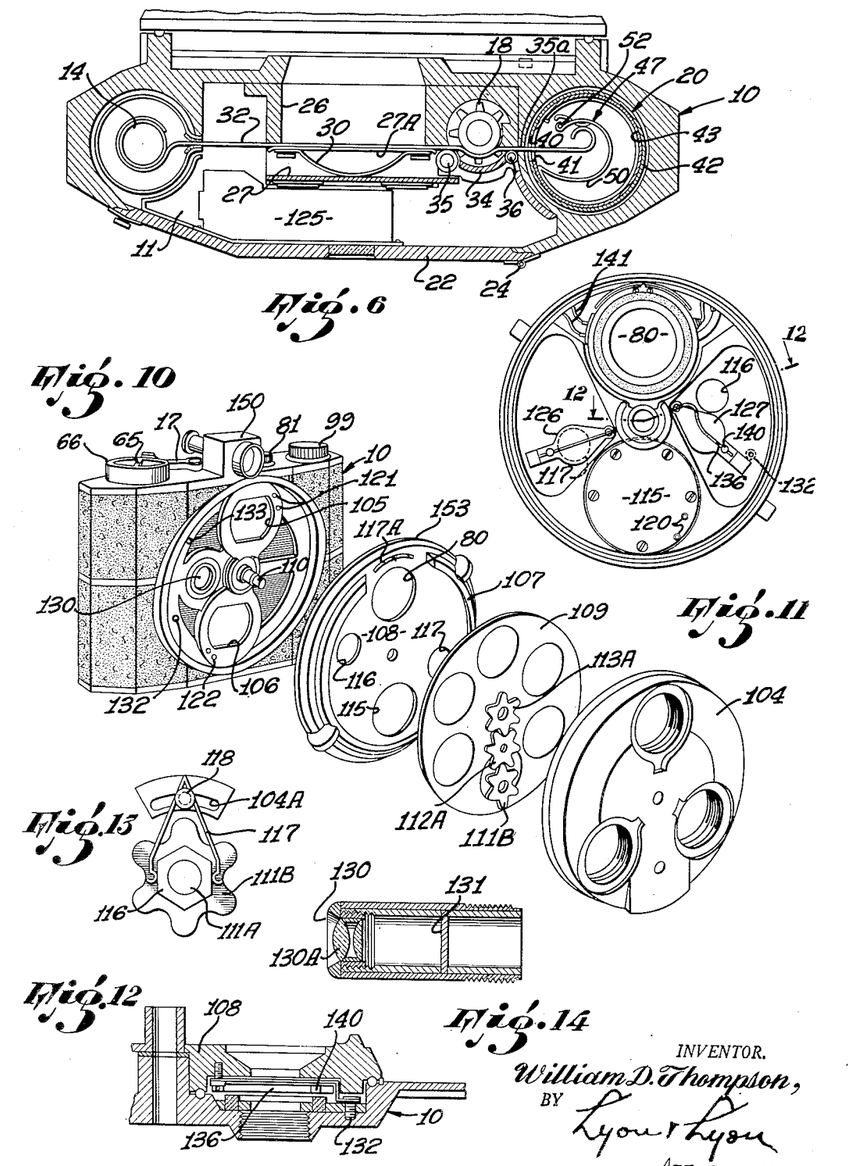
Figure 6 is a sectional view taken substantially on the line 6—6 of Figure 4.
Figure 10 is an exploded view showing in perspective and in more detail the lens turret, filter turret and shutter turret of the camera shown in Figure 1.
Figure 11 is a view in elevation of the back of the shutter turret shown in Figure 10 with one of the normally spring biased optical gates shown in displaced position from its position where it is arranged to normally close off the focusing apertures.
Figure 12 is a sectional view taken substantially on the line 12—12 of Figure 11.
Figure 13 is a view in elevation of an expedient whereby the filter and lens turrets may be permanently adjusted for alignment.
Figure 14 is a sectional view taken substantially on the line 14—14 of Figure 4.

The film in its travel from the reel member 14 loaded into the camera travels past the film frame 26 and then passes along a curve as shown in Figure 6 over the sprocket drive wheel 18, 19 where it is pressed into position against such sprocket wheels by the pivoted guide roller structure 34, then passes through the case aperture 35A into the cassette structure 20. As shown in Figure 2, the guide roller structure 34 carries guide rollers 35, 36 at opposite ends and is pivotally mounted on the frame and movable to the extended position shown therein and to the other extended position shown in Figure 6 wherein the rollers 35, 36 firmly press the film perforations against the sprocket drive wheel due to engagement with the end of the latched gate 27.

Of importance is the fact that the film 32 is pressed into engagement with more than one tooth; and, preferably three teeth of the sprocket wheel enter the film perforations. For this purpose the radius of the sprocket wheel at the base of the toothed portions is great enough to cause the film to curve slightly as shown in Figure 6. After passing over the sprocket wheels 18, 19, the film 32 passes through the apertured portion 35A which has an opening slightly greater than the thickness of the film for an important purpose described later. After passing through this aperture 35A, the film 32 passes through the two cooperating apertured portions 40, 41 of the cassette structure 20 which is capable of cutting off film stored therein regardless of the amount of film remaining in the camera.

The design of the film channel and the pivoted guide 34 serves to guide the film into the cut off cassette 20. All this makes the camera very easy to load. It is only necessary to insert the supply spool 14, lay the end of the film in the film channel far enough that it reaches the sprocket wheels 18, 19, close the film gate 27, close the camera door 22, and stroke the film transport lever 17 once, and then the camera is loaded.

Figures 5, 7, 8, 16, 17:
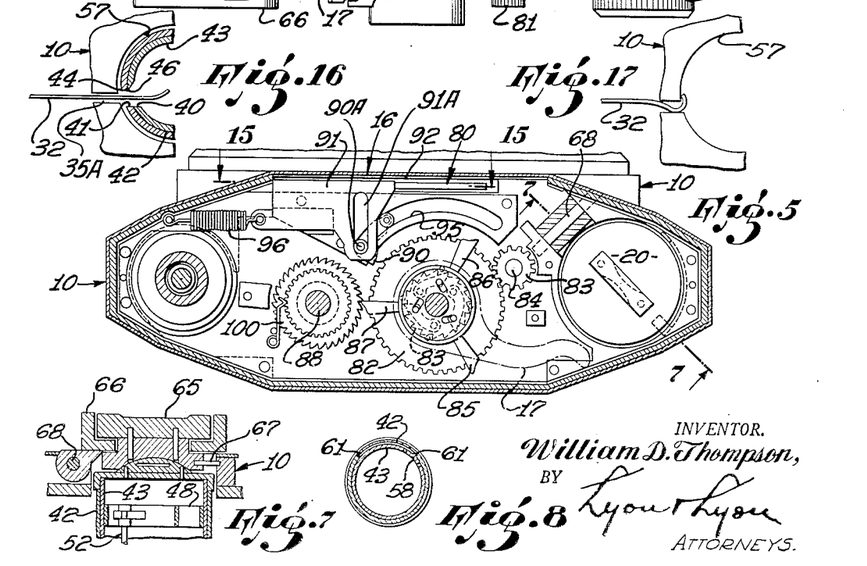
Figure 5 is a sectional view taken substantially on the line 5—5 of Figure 4.
Figure 7 is a sectional view taken substantially on the line 7—7 of Figure 5.
Figure 8 is a sectional view taken susbtantially on the line 8—8 of Figure 4.
Figures 16 and 17 show respectively in enlarged form the disposition of film before a film cutting operation and after the film cutting cassette is removed from its well.

As perhaps best seen in Figure 9, the cassette structure 20 includes an outer tubular member 42 and an inner cooperating telescopic member 43, the outer member having the rectangular opening 41 therethrough, while the inner member 43 has a truncated triangular opening 40 with the angularly disposed cutting edge 46 adapted to cooperate with the film and the edge 44 to neatly cut off film with a minimum of required effort. As indicated in Figure 16, as the cassette slot is closed the film is gripped by the two flat edges and held while the knife edge shears the film.

In order to guide movement of the film when threaded into the outer member 42, the spring guide member 47 is provided and is maintained therein in position due to the inherent resilient nature of its two spaced resilient modified ring members 48, 49 having openings therein for allowing passage of film therein. These resilient members 48, 49 press against the inner wall of member 43 and each have either integrally formed or attached thereto curved resilient cantilever members 50, 51 of reduced thickness, the free ends of which are connected by the spacer bar 52. Thus, when and as film is fed into the aperture 41 it has a tendency to curl and its curling movement is guided by the resilient end members 50 and 51 thereby to form a roll of stored film of small diameter and to press these members 48, 49 back further and further as more film is stored into the cassette, which in turn necessitates an increased force to be exerted on the film entering the cassette. In order that the entire amount of film originally stored on the supply reel 14 may be inserted in the cassette, the sprocket wheels 18, 19 are disposed as described specifically above in accordance with an important feature of the present invention.

Figure 4:
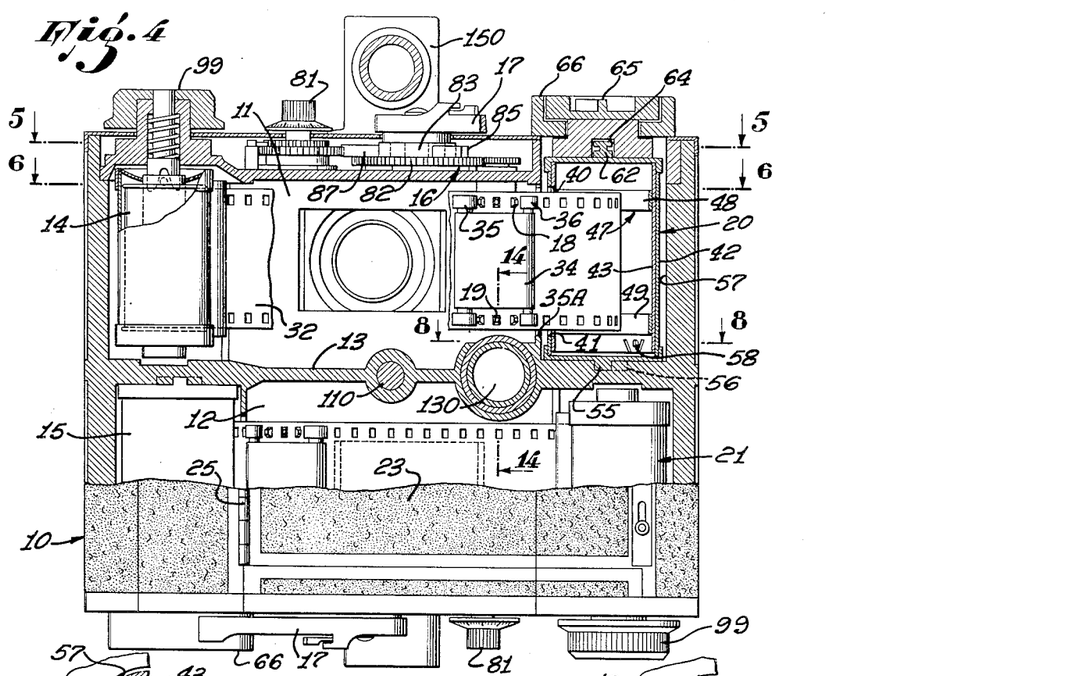
Figure 4 is a sectional view taken substantially on the line 4—4 of Figure 3.

The outer cylinder 42 has a lug 55 on the bottom which fits into a cooperating recess 56 in the bottom of the cassette well 57, in the camera. This is to hold cylinder 42 stationary when the other or inner cylinder 43 is rotated. The inner cylinder 43 has a small V cut into its bottom edge as shown in Figure 4 with a ball bulge 58 pressed near the tip of the V. When the two cylinders 43, 42 are put together empty and ready to go into the camera, the ball bulge 58 near the tip of the V is started into the groove 60 of the outer cylinder 42 and pushed to the bottom. There is an indent 61 at the bottom of the groove 60 which serves to hold the two members together with sufficient force that it will not come apart or turn easily in which case the apertures 40, 44 are maintained in nonaligned position with the interior of the cassette light tight. When the assembly is inserted in the well 57 in the camera, the lug 55 on the bottom of the outer cylinder 42 lines up with the recess 56 and the curved lug 62 on the top of the inner cylinder 43 lines up with the slot 64 in the turning handle 65 that is part of the circular door 66 on the top of the camera. In this position the door 66 is unlocked and may be pivoted at will to open and closed positions. In order to lock the door 66 on the camera frame to make the well 57 light-tight, the turning handle 65 is moved to locked position wherein the projection 67 abuts against the frame 10 to prevent the door 66 from being pivoted about its pivot pin 68 which is stationarily mounted on case 10. When the handle 65 is moved to locked position shown in Figure 7, the ball bulge 58 travels in the horizontal part of the groove to the other indent 69. When this position is reached the camera door 66 is locked and the apertures 40, 41 are lined up and open ready to receive film.

After a portion of the camera film has been exposed and it is desired to remove this without disturbing the balance of the film in the camera, the turning handle 65 on the circular door 66 is turned to its unlocked position whereupon the film is automatically cut by the knife edge 46 and the aperture 41 is closed, thus allowing withdrawal of the cassette 20 without fear of light fogging the cut film therein. As soon as the film is cut the natural curl of the film causes it to curl against the sides of the small slot 35 leading from the film chamber 11 to the camera well 57 thus automatically sealing the light out of the film chamber 11. Under these circumstances, I have left the camera loaded, with the circular door 66 open in the bright sun for two hours and found that the film in the film chamber 11 of the camera fogged back only one half inch.

Of importance is the fact that when the film is thus automatically sheared off by the cutting action of the cooperating edges 44, 46, the edge of the film left protruding out of the close fitting channel 35A curls because of its natural tendency to such an extent as to provide a light barrier against the penetration of light, for example, past the first fractional part of an inch of the film. This little portion of film which may become fogged is of unimportance since the fogged portion is not exposed by the lens. It is apparent that the camera elements may be so proportioned that such fogging occurs only on unexposed portions. Thus, this expedient allows a very inexpensive construction avoiding expensive automatic closure structures which would otherwise have to be provided.

The particular mechanism 16 whereby sprocket wheels 18, 19 are intermittently rotated to feed film, frame by frame, from the supply reel 14 to the cassette 20 may take many different forms and shapes as is well understood in this art. The particular mechanism 16 shown and described in connection with Figure 5 is thus merely exemplary of others which may be used to intermittently rotate the sprocket wheels 18, 19.

The film is transported frame by frame upon repeated operation of the lever handle 17. One stroke of this handle 17 transports the film 32 one frame, cocks the shutter mechanism 80, and operates the frame counter 81. The large gear 82 is turned through the pawl and ratchet mechanism 83 by the handle 17. One stroke of the handle 17 rotates this gear 82 120° which in turn rotates the small gear 83 mounted on the same rotatable shaft 84 as are the driving sprockets 18, 19, one complete turn plus ⅛ turn to move the film 32 to the next picture area with a margin between frames.

Lugs 85, 86, 87 on the large gear 82 move the frame counter shaft 88 one frame for each stroke of the lever 17. After moving the frame counter shaft 88, one of the lugs 85, 86, 87 picks up the projecting cam 90 (Figure 5) slidably mounted in the arcuate cam slot 95 and as the cam 90 moves around with the gear 82 in an arcuate path it draws the rack member 91 with it which through the rack and gear arrangement 91, 92 cocks the shutter 89 having cocking lever 80A in conventional manner. The rack member 91 is slidably mounted for movement in a straight line on the camera frame and is loosely coupled to the cam member by means of a pin 90A projecting through a slot 91A in the rack member 91. The rack member 91 has, as shown in Figure 15, teeth which mesh with the teeth on the arcuate shaped rack member 92 which is slidably mounted, for arcuate movement, on the camera frame. One end of the gear member 92 is pointed and adapted to engage the shutter cocking lever 80A to effect cocking of the shutter. The center of curvature of the slot 95 is slightly off-set from the hub center of the big gear 82 so that as the lug 85, 86, 87, as the case may be, moves through its arc it continues in engagement with the sliding cam 90 only to the point where the shutter has been cocked. As the lug continues to move forward with the gear 82 in the remaining portion of the stroke of the lever 17, it loses contact with the cam 91, and the member 91 is returned to its normal starting position by the tension spring 96 having one of its ends attached to the camera frame and the other one of its ends attached to member 91. Thus, upon clockwise rotation of lug 87 in Figure 5, the cam 90 is engaged and moved to move the rack member 91 to the right in Figure 5, i. e., to the left in Figure 15 to in turn bring the gear member 92 into engagement with the cocking lever 80A to effect cocking of the shutter.

If all of the film roll has been used and it is desired to rewind it back into the supply spool 14, the transport handle 17 is moved backward slightly beyond the limit of its return stroke against a small spring member in the top of the camera and not shown in any of the drawings. This backward movement causes the ratchet element of mechanism 83 to raise so that movement of a handle (not shown) attached to the ratchet release and in the hub of the handle may complete the releasing of this pawl ratchet arrangement 83 whereupon the rewind knob 99 may be turned in reverse direction to rewind the film 32 on spool 14 without causing the handle 17 to move. As the film 32 is being rewound the film driving sprockets 18, 19 cause the small gear 83 to turn so as to turn the large gear 82 in the reverse direction. As the lugs 85, 86, 87 turn in the reverse direction they again contact the cam 90 in the curved slot 95, but as this cam is pivoted in the slot as shown in the drawing it simply tips enough to let the lugs pass, and is not otherwise moved. As the lugs 85, 86, 87 continue in the reverse direction on the rewind it again contacts the frame counter and causes it to turn also in reverse. This frame counter is free to turn in either direction being held only by a light spring ratchet 100 to thus serve as an indication as to when the film has all been rewound onto the supply spool 14, and of course, is automatically reset to zero by this action, although it may be easily be set by hand simply by rotating the knob 81 on the top of the camera on which the number of exposures are marked.

A lens system is provided through which the films carried in the compartments 11, 12 may be exposed. This lens system may include any suitable or desirable type of lens such as a conventional type of lens 101, a telephoto lens 102, and a wide angle lens 103 all carried on a turret lens disc 104 all mounted on the front of the camera box 10 in position to permit the lens system turret 104 to be rotated in alignment with the lens box apertures 105 and 106. The turret lens disc or turret 104 is mounted within the cylindrical guide flange 107 on shutter turret 108 as is the filter disc 109.

The lens disc or turret 104, the filter disc or turret 109, and the shutter disc or turret 108 are mounted for rotation about the axis of the centrally located shaft 110 upon which they are mounted. This shaft 110 passes through a central opening through the camera case 10 and is journaled for rotation on the spaced bearing members 111 and 112 with the back end of the shaft 110 being provided with a suitable lock nut 113 recessed in the camera case 10 to prevent withdrawal of the shaft 110. The forward end of the shaft 110 has affixed thereto the lens turret 104 whereby it may be freely rotated through 360° on the case 10.

The filter turret 109 is rotatably mounted on the outside surface of shaft 110 and may be moved independently of the lens turret 104 into adjusted position with respect thereto.

However, the filter turret 109 is releasably locked in position with respect to the lens turret 104 so that the filter turret 109 is rotated simultaneously with rotation of the lens turret 104. The filter turret 109 may have six different openings therethrough with one of the openings a clear opening and the other five openings may have different light filter elements mounted therein.

The filter turret 109 may be rotated independently of the lens turret 104 to bring either one of the clear or filter elements thereon into alignment with either one of the lens elements 101, 102, 103, upon rotation of the filter control knob 110A. Rotation of the filter control knob 110A causes corresponding rotation of the filter disc 109 through the three six-toothed gears 111B, 112A and 113A, the gear 111B being rotatably mounted on the lens turret 104, the gear 112A being an idler gear mounted for rotation on the filter turret 109 and the third gear 113A being affixed centrally to the filter turret.

The filter turret may be indexed automatically in adjusted position with respect to the lens turret by, for example, the arrangement shown in Figure 13. In Figure 13 the shaft 111A upon which the filter control knob 110A and gear 111B are mounted may have affixed thereto or integrally formed therewith a hexagon nut 116 cooperating with the V-shaped spring element 117, the apex of which is held by means of releasable locking screw 118 on the underside of the lens turret to serve as an alignment adjustment. By loosening the screw 118 at the apex of the V- spring and moving it in the slot 104A causes the spring to move the filter openings in alignment with the lens openings after which the screw is locked in place.

The shutter turret 108 (Figures 10 and 11) is mounted for rotation on the case 10 and may be held in indexed position thereon by means of a conventional spring detent means mounted on adjacent faces of the shutter turret 108 and the camera box 10. This shutter turret 108 is mounted for rotation through an angle of about 180° and includes a diametrically disposed shutter mechanism 80, a photoelectric cell element 115 and diametrically opposed focusing apertures 116, 117 as well as an adjustable stop control member 117A for the shutter mechanism and a circular annular flange member 107.

The photocell 115, as shown in Figure 11, has a pair of terminals 120 thereon which may be moved into engagement with either one of the pairs of connecting terminals 121, 122 which in turn are connected through leads 123, Figure 2, to a direct current reading meter 125 mounted on the hinged back cover plate 22 for convenient visual reading.

The shutter turret 108 has mounted thereon on its back face a pair of spring biased light gate members 126, 127 pivotally mounted thereon which normally close the focusing apertures 116, 117. These pivoted spring biased gate members 126, 127 may be moved as indicated in Figure 11 to a position wherein light may be transmitted through the focusing tube 130 onto the ground glass screen 131 within the focusing tube by either one of the roller elements 132, 133 mounted on pins on the camera case 10. These light gate means 126, 127 close the focusing apertures 116, 117 when and as the turret 108 is being rotated either to place the shutter mechanism 80 in registry with either one of the picture openings 105.

The spring biased gate member 127 is spade-shaped with the apex of the spade being pivotally connected near a central point on the back face of the shutter turret 108 with its free end in position for engagement by either one of the two roller members 132, 133 on the camera case 10 and with a leaf type of stright spring 136 slidably mounted in the spaced spring retaining member 140 on the gate as indicated in Figure 12. The shutter 80 itself may be of conventional structure operable by the shutter release element 80A. Also, the shutter 80 may serve to operate an electrical switch for energizing a flash bulb connected to the leads 141 extending from the shutter.

It is apparent from the structure thus far described that either one of the three lens 101, 102, 103 may be moved into aligned pisition with either picture aperture 105, 106 in the camera case 10 and that either the clear opening or one of the remaining five filter elements mounted in the filter turret 109 may be interposed between the selected lens and aligned picture opening for taking a picture.

In operation, the camera may be loaded with film, for example, a roll of black and white film in the upper film compartment and a roll of colored film in the lower compartment.

Assuming that pictures are to be taken on the black and white film, the shutter turret is turned until the shutter is in its uppermost position (where it remains until it is desired to expose the color film). When the shutter is in such upper position the small spring biased disc shutter which would otherwise be over the focusing aperture, is held in open position and remains in such open position until the shutter turret is turned. Now assuming that the 50 millimeter lens is the one selected for use and no filter is desired, the filter selecting knob is turned until the clear opening in the filter turret is aligned behind such selected lens. The lens turret is then turned (carrying the filter turret with it) until the selected lens is aligned with the focusing aperture with the iris diaphram in the lens barrel at its wide open setting. Now, upon looking into the eye piece end, at the back of the camera, on the focusing microscope, a brilliant and highly magnified image of a small portion of the scene is seen on the ground glass screen. The full field of view is not projected on the ground glass screen since the regular view finder is used for the purpose of defining the full field of view. The focusing microscope is for sharp and critical focusing. For example, if a person were taking a picture at the usual portrait distance he would see in the focusing microscope not much more than a single eye, or perhaps a button on the clothes on the subject but in such highly magnified form that each eyelash or individual threads on the button, is examined until absolutely critical focusing is achieved. This focusing microscope serves another very useful purpose, namely to indicate to the operator the actual depth of focus, which may be observed and controlled by the operation of the lens iris diaphram, thus, eliminating so-called depth of focus scales which are usually attached to some part of the better present day cameras, but which is not as accurate as the method and apparatus described herein.

After the camera is focused as recited above, and it is desired to take an exposure meter reading, the lens turret is turned, again taking with it the filter turret, with the clear opening therein still in alignment behind the lens, until the lens being used is in alignment with the photoelectric cell, which is mounted on the shutter turret opposite the shutter. Light impinging on the photocell generates a small electric current which is conducted to the meter through the contacts and leads. This meter may be constructed as is the one shown in my above mentioned prior patent, with a series of scales marked in shutter speeds for as many as ten different film speeds. Thus, every film speed has a corresponding scale marked in shutter speeds which are selectable by rotating a small knob on the meter. For example, the scale may be set to correspond to the film speed of the film in the camera and in such case, a series of shutter speeds on the meter scale corresponds in number to the number of speeds of the shutter, the shutter speeds usually being about ten in number. The operator approximates what shutter speed he has to have for a certain subject, such as a scene in which there is considerable movement, or one in which there is no movement, but for these speeds the operator does not know, except by approximation, as to how much light to admit to obtain a well exposed negative. In the camera described herein, with the scale set as above for the proper film speed, the camera may be aimed at the subject, for example, a moving object that would require $1/100$ of a second, and in such case is necessary only to set the lens iris diaphram until the meter hand pointed to $1/100$ of a second on the scale. In this manner the correct amount of light for the subject matter at hand is obtained.

All calculation for exact calibration of the instrument is accomplished in the manufacture and assembly of the camera.

Assuming that all of the foregoings are to be repeated for another picture but that in this second picture it is desirable to use a colored filter, the procedure is exactly the same as above except that the filter of the desired color is brought into alignment with the lens being used. There is a distinct advantage in having the filters arranged as they are in this camera. To place a filter in front or behind causes a certain amount of defocusing which gets progressively worse as the color of the filter approaches red. In the prior art cameras, the size of an enlargement of negatives exposed therein is limited by such defocusing produced by the filter used in exposing the negative.

However, in the camera shown and described herein the filter is brought into alignment behind the lens and focusing is done through the filter which results in a negative just as sharp as is the case when no filter is used at all.

Now, if it is desired to take a picture on the color film in the camera, the shutter turret is rotated to its lowermost position with the shutter thereon in alignment with the lower film compartment in which the color film is present. When the shutter turret is turned, the spring biased focusing aperture shutter automatically closes and remains closed as the small focusing aperture through the shutter turret passes over the picture aperture, thus preventing exposure of the film should a lens happen to be in alignment with such aperture. When the shutter turret reaches its other position, the other focusing aperture with its small disc shutter in alignment with the focusing tube and this small spring biased disc shutter is automatically moved to open position as before. All other operations are then repeated.

All of this in such detail sounds very involved but is actually not the case, since all of the operations specified herein are performed in the better cameras but with a great deal more difficulty since all the lenses, filters, exposure meter, are separate items and have to be carried and handled separately.

The final operation in taking a picture, would be, of course, after all of the above details have been accomplished, to set the lens in alignment with a picture aperture, where the shutter is and set the shutter speed accordingly to the meter indication after which the shutter is released.

For extremely fast operation where the scenes being photographed are of a general nature, such as street scenes, landscapes and the like, the lens may be set at infinity, shutter speed established and then pictures taken as fast as desired which is much faster, in fact, than in present day cameras, for, in such cases, it is necessary only to compose the scene in the view finder, release the shutter, stroke the film transport lever once to cock the shutter ready for the next shot. Pictures under these conditions may be taken as fast as one every one-half second if desired.

In the event that the operator wishes to ascertain whether the selected lens is correctly focused for taking pictures, the lens turret and filter turret as a unit is rotated until the selected lens is aligned with the focusing tube 130 in which case an image may be viewed on the ground glass screen 131 and if necessary, the lens adjusted to sharpen the image.

Thus, picture scenes may be projected through either picture apertures 105, 106 and a reading of light intensity may be obtained with a filter element in place and critical focusing may also be obtained. The focusing tube 130 may have either a ground glass screen or acid etched glass. Actually, no glass is absolutely necessary, since the picture taking lens forms a virtual image at the focal plane. The focusing tube structure 130 including the corrective magnifying lens 130A serves a purpose similar to the ocular of a microscope.

Preferably, the camera includes a view finder 150 mounted on the top of the camera in such a way that it is automatically adjusted in a position depending on whether pictures are being projected through picture aperture 105 or picture aperture 106. For this purpose, the view finder 150 is pivotally mounted at 155 on the top of the camera box 10 with a spring 151 normally pressing a cam surface 152 thereon into positive engagement with a cam surface 153 provided on the outer periphery of the shutter turret 108 for raising the front end of the view finder 150 when picture scenes are being projected through the picture aperture 105 and for lowering such front end of the view finder when pictures are being projected through the lower picture aperture 106.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. A camera including a box, a partition dividing the box into two separated film-carrying chambers having separated exposure apertures, means for supporting and guiding a separate film in each of said chambers, a lens turret, a lens system mounted on the turret, means for rotatably supporting the lens turret to permit the lens system to be selectively moved to position with relation to the exposure apertures, a filter disc having a plurality of apertures interposed between the turret and the exposure apertures, a focusing aperture formed through the box, means for rotatably supporting the filter disc, filters carried by the filter disc whereby the filter may be selectively interposed in the focusing aperture while focusing, and thereafter interposed between the lens system and the exposure aperture when the exposure is to be made on one of the films, a rotatable shutter turret rotatably mounted and movable into aligned position between the lens turret and either one of said picture apertures means rotatably supporting said shutter turret on said box to permit the shutter thereon to be aligned with either one of said exposure apertures, said shutter turret having mounted thereon a shutter mechanism to control the amount of light passing therethrough and a photocell spaced from said shutter mechanism, said photocell and shutter mechanism being spaced to allow positioning of only one of these elements at one time in alignment with said lens system mounted on the lens turret.

2. In a camera, the combination of a case, means for supporting a plurality of independent films in the case, film-apertures for the different films located equidistant from a central axis, a face plate for the case, a filter disc before the face plate and mounted for rotation on said axis, a plurality of filter screens carried on the filter disc on a radius enabling any one of the same to register individually with said film-apertures, a lens-disc rotatably mounted on the said axis and located on the outer side of the filter disc, a lens barrel carried by the said lens-disc projecting forward from the same, located on a radius from said axis to enable the lens barrel to be aligned with any one of the said film-apertures, means for holding the filter disc in a plurality of different oriented positions with any one of the filters in alignment with any one of the said film-apertures, and means operable at will for latching the lens-disc to the filter disc to enable rotation of the lens disc on said axis to be imparted to the filter disc, and a shutter turret having a shutter mechanism mounted thereon movable into position between said lens disc and any one of said film apertures, said shutter turret having mounted thereon a shutter mechanism to control the amount of light passing therethrough and a photocell spaced from said shutter mechanism, said photocell and shutter mechanism being spaced to allow positioning of only one of these elements at one time in alignment with said lens system mounted on the lens turret, said shutter mechanism including a cocking lever for cocking the shutter, and a manually operable mechanism mounted on opposite sides of said case with an element thereof selectively movable to engage and move said shutter cocking lever.

3. In a camera, the combination of a case, means for supporting a plurality of independent films in the case, film apertures for the different films located equidistant from a central axis, a shutter disc mounted for rotation with respect to said case, means rotatably supporting said shutter disc on said case to permit the shutter on said disc to be aligned with either one of said film apertures, a filter disc before the shutter disc and mounted for rotation on said axis, a plurality of filter screens carried by the filter disc on a radius enabling any one of the same to register individually with the same film apertures, a light meter element carried on the rotatable shutter disc, said filter disc having an unscreened aperture on a radius from said axis enabling the same to be positioned to register with said light meter element, a lens disc mounted before said filter disc and rotatable on the said axis, and a lens barrel carried by the said lens disc and located on a radius enabling the same to be positioned to register with the light meter element and the unscreened aperture to enable light to impinge upon the light meter element through the lenses in the lens barrel for measuring the degree of illumination before making an exposure, and a single shutter mechanism to control the amount of light passing therethrough mounted on said shutter disc spaced from and separate and independent of said light meter element, said single shutter mechanism being movable in registry with a selected one of said film apertures.

4. In a camera, the combination of a case, means for supporting a plurality of independent films in the case, film apertures for the different films located equidistant from a central axis, a shutter disc rotatably mounted about said central axis, means rotatably supporting said shutter disc on said case to permit the shutter on said disc to be aligned with either one of said film apertures, a second disc before the shutter disc mounted for rotation on said axis, a light meter element carried by the shutter disc at the same distance from the axis as said film apertures, said second disc having an aperture therethrough on a radius from said axis that enables the same to be positioned to register with said light meter element, a lens disc mounted before said first named disc and rotatable on the said axis, a lens barrel carried by the lens disc and located on a radius enabling the same to be positioned to register with the registering light element and the said aperture, to enable the light to impinge on the light meter through the lenses of the lens barrel for measuring the degree of illumination before making the exposure, and a single shutter mechanism to control the amount of light passing therethrough mounted on said shutter disc spaced from and separate and independent of said light meter element, said single shutter mechanism being movable in registry with a selected one of said film apertures.

5. In a camera, the combination of a case, means for supporting a plurality of independent films in the case, film apertures for the different films located equidistant from a central axis, a shutter disc rotatably mounted about said central axis, means rotatably supporting said shutter disc on said case to permit the shutter on said disc to be aligned with either one of said film apertures, a second disc before the shutter disc mounted for rotation on said axis, a light meter element carried by the shutter disc in the same distance from the axis as said film apertures, said second disc having an aperture therethrough on a radius from said axis that enables the same to be positioned to register with said light meter element, a lens disc mounted before said shutter disc and rotatable on the said axis, a lens barrel carried by the lens disc and located on a radius enabling the same to be positioned to register with the registering light meter element and the said aperture, to enable the light to impinge on the light meter through the lenses of the lens barrel for measuring the degree of illumination before making an exposure, means for yieldingly holding the second named disc in a position to maintain the same aperture in registry with the light meter element, and means operable at will to latch the lens-disc to the second named disc to enable rotation of the lens disc to be imparted to the second named disc, and a single shutter mechanism to control the amount of light passing therethrough mounted on said shutter disc spaced from and separate and independent of said light meter element, said single shutter mechanism being movable in registry with a selected one of said film apertures.

6. In a camera, the combination of a case, means for supporting a plurality of independent films in the case, film apertures for the different films located equidistant from a central axis, a shutter disc rotatably mounted about said central axis, a rotatable filter disc guided in a flange on the shutter disc and having a plurality of filter screens spaced circumferentially about the said axis and located at a radius enabling the same to be aligned with any one of the said film-apertures, a lens disc guided by said flange on said shutter disc and rotatable on said axis, a lens barrel carried by the said lens disc and located on a radius from said axis enabling the lens barrel to be aligned with any one of the said film apertures, means for yieldingly holding the filter disc in a plurality of different positions with any one of the filter screens in alignment with any one of the said film apertures, and means operable at will for latching the lens-disc to the filter disc so as to enable rotation of the lens disc to be imparted to the filter disc, and a single shutter mechanism to control the amount of light passing therethrough mounted on said shutter disc for movement therewith to a position in registry with a selected one of said film apertures, said shutter mechanism including a shutter cocking lever, and means mounted on said case for engaging and moving said shutter lever when said shutter mechanism is in registry with either one of said film apertures.

7. In a camera, the combination of a case, a partition dividing the interior of the case into compartments, a shutter disc rotatably mounted with respect to said case, a picture aperture in each of the compartments, means arranged to mount a film in each compartment and for guiding the same across the axis of its corresponding picture aperture, a filter disc rotatably mounted on an axis substantially in the plane of the partition, said picture apertuers being located equidistant from the said axis, a lens disc also mounted to rotate on the said axis outside of the filter disc, a lens barrel carried thereby capable of alignment with said picture apertures individually, means arranged to yieldingly hold the filter disc in different oriented positions so that any one of the filters carried thereby may register with any one of the picture apertures and means operable at will to register the lens disc to the filter disc, said shutter disc having mounted thereon a shutter mechanism to control the amount of light passing therethrough for movement therewith, said shutter mechanism including a shutter cocking lever, said shutter mechanism being movable to a position in registry with a selected picture aperture in any one of said compartments, and means mounted on the case for actuating said cocking lever when said shutter mechanism is positioned in registry with any picture aperture of said compartments.

8. In a camera, the combination of a case, a plurality of picture apertures in said case, a focusing aperture in said case, a lens turret, a shutter turret, means mounting said lens turret and said shutter turret for independent relative rotational movement about a common axis on said case, said picture apertures and focusing apertures lying on the arc of a circle having its center corresponding to said rotational axis, said shutter turret having a focusing aperture therethrough, and light-gate means interposed between said focusing aperture in said case and said focusing aperture in said shutter turret, means maintaining said light-gate means normally closed to close said focusing aperture in said shutter turret and, means coacting between said light gate means and said case to automatically move said gate to opened position when said focusing aperture in said shutter turret is moved into aligned position with the focusing aperture in said case.

9. In a camera, the combination of a case, a plurality of picture apertures in said case, a focusing aperture in said case, a lens turret, a shutter turret, means mounting said lens turret and said shutter turret for independent relative rotational movement about a common axis on said case, said picture apertures and focusing apertures lying on the arc of a circle having its center corresponding to said rotational axis, said shutter turret having a focusing aperture therethrough, and light-gate means interposed between said focusing apertures in said case and said focusing aperture in said shutter turret, means maintaining said light-gate means normally closed to close said focusing aperture in said shutter turret and, means coacting between said light gate means and said case to automatically move said gate to opened position when said focusing aperture in said shutter turret is moved into aligned position with the focusing aperture in said case, said shutter turret having mounted thereon a single shutter mechanism to control the amount of light passing therethrough movable therewith into registry with a selected one of said picture apertures, said shutter turret having mounted thereon a photocell element spaced from and separate and independent of said shutter mechanism, said photocell element being movable into registry with a selected one of a plurality of lenses on said lens turret.

10. The invention defined in claim 9, characterized by the incorporation with the structure claimed therein of a shutter cocking lever positioned adjacent said shutter mechanism and adapted to contact the same to cock the same, and means mounted on said case for engaging and moving said cocking lever when said shutter mechanism is positioned in registry with any one of said plurality of picture apertures.

11. In a camera, the combination of a case, said case having a plurality of picture apertures therein, a lens turret, a shutter turret, means mounting said shutter turret and lens turret for relative independent rotation with respect to said picture apertures, said shutter turret having mounted thereon a single shutter mechanism to control the amount of light passing therethrough for movement therewith into registry with any one of said plurality of picture apertures, said single shutter mechanism including a cocking lever for cocking the shutter mechanism, and means mounted on said case for engaging and moving said cocking lever when said shutter mechanism is positioned in registry with any one of said picture aperturse.

WILLIAM D. THOMPSON.

REFERENCES CITED

The following references are of record in the file of this patent:

UNITED STATES PATENTS

| Number | Name | Date |
| --- | --- | --- |
| 634,881 | Dallmeyer | Oct. 17, 1899 |
| 1,764,450 | Hindle | June 17, 1930 |
| 2,058,532 | Tuttle | Oct. 27, 1936 |
| 2,194,031 | Riszdorfer | Mar. 19, 1940 |
| 2,298,574 | Lockhart | Oct. 13, 1942 |
| 2,315,284 | Thompson | Mar. 30, 1943 |
| 2,446,200 | Tait et al. | Aug. 3, 1948 |

FOREIGN PATENTS

| Number | Country | Date |
| --- | --- | --- |
| 454,234 | Great Britain | Sept. 25, 1936 |
| 233,870 | Switzerland | Nov. 16, 1944 |